United States Patent
Crohn et al.

(10) Patent No.: US 11,619,749 B2
(45) Date of Patent: Apr. 4, 2023

(54) DOSIMETRY DEVICE FOR QUANTIFICATION OF RADIATION

(71) Applicant: ISP Investments LLC, Wilmington, DE (US)

(72) Inventors: Robert Crohn, Towaco, NJ (US); David K. Hood, Basking Ridge, NJ (US)

(73) Assignee: ISP Investments LLC, Wilmington, DE (US)

( * ) Notice: Subject to any disclaimer, the term of this patent is extended or adjusted under 35 U.S.C. 154(b) by 0 days.

(21) Appl. No.: 17/257,729

(22) PCT Filed: Jun. 28, 2019

(86) PCT No.: PCT/US2019/039811
§ 371 (c)(1),
(2) Date: Jan. 4, 2021

(87) PCT Pub. No.: WO2020/009930
PCT Pub. Date: Jan. 9, 2020

(65) Prior Publication Data
US 2021/0286093 A1    Sep. 16, 2021

Related U.S. Application Data

(60) Provisional application No. 62/694,291, filed on Jul. 5, 2018.

(51) Int. Cl.
*G01T 1/06*    (2006.01)
*G01J 1/02*    (2006.01)
*G01T 1/08*    (2006.01)

(52) U.S. Cl.
CPC ............. *G01T 1/06* (2013.01); *G01J 1/0219* (2013.01); *G01T 1/08* (2013.01); *G01J 2001/0261* (2013.01)

(58) Field of Classification Search
CPC .. G01T 1/06; G01T 1/0219; G01T 1/08; G01J 2001/0261; G01J 1/0219
See application file for complete search history.

(56) References Cited

U.S. PATENT DOCUMENTS 5,051,597 A * 9/1991 Lewis .................. G01T 1/06
250/474.1
5,637,876 A    6/1997 Donahue et al.
(Continued)

FOREIGN PATENT DOCUMENTS

WO    WO 2004/017095 A1    2/2004
WO    WO 2017/054008 A1    3/2017

OTHER PUBLICATIONS

Chan, Radiochromic film as a tool to study and validate a commercial Monte Carlo dose calculation algorithm for electron radiotherapy, Jul. 2016, Royal Melbourne Institute of Technology (RMIT) University Thesis, pp. 1-135 (Year: 2016).*

(Continued)

*Primary Examiner* — David P Porta
*Assistant Examiner* — Jeremy S Valentiner
(74) *Attorney, Agent, or Firm* — William J. Davis; Nathalie Tietcheu

(57) ABSTRACT

Provided herein is a dosimetry device for quantifying the dosage of radiation emitted from a radiation source, the device comprising: (i) a radiation dose indicator; (ii) an optical means to capture the color change; and (iii) a software means to compare the optical density of the dose indicator as compared to a predetermined calibration curve. Also provided herein is a method of quantifying the dosage of radiation emitted from the radiation source. Further provided herein is use of said dosimetry device in various medical, food and industrial applications.

11 Claims, 5 Drawing Sheets

(56) References Cited

U.S. PATENT DOCUMENTS

| | | | |
|---|---|---|---|
| 7,476,874 B2* | 1/2009 | Patel | G01T 1/04 |
| | | | 250/484.5 |
| 8,340,249 B2 | 12/2012 | Kraus et al. | |
| 8,604,415 B2* | 12/2013 | Micke | G01T 1/10 |
| | | | 250/252.1 |
| 9,833,214 B2 | 12/2017 | Imamura | |
| 2007/0019790 A1* | 1/2007 | Lewis | G03F 7/025 |
| | | | 378/163 |
| 2008/0023647 A1* | 1/2008 | Patel | G01T 1/06 |
| | | | 250/473.1 |
| 2017/0191866 A1* | 7/2017 | Balooch | G01J 1/0219 |
| 2018/0259654 A1* | 9/2018 | Short | G01T 1/10 |

OTHER PUBLICATIONS

References cited in the International search report of PCT Application No. PCT/US2019/039811 published on Jan. 9, 2029, under publication No. WO2020/009930 A1.

\* cited by examiner

DOSIMETRY DEVICE FOR QUANTIFICATION OF RADIATION

FIELD OF THE INVENTION

The present application relates to a dosimetry device comprising a radiation sensitive composition, an optical means and a software means to quantify the dosage of radiation emitted from the radiation source. The present application further relates to use of said dosimetry device in various medical, food and industrial applications.

BACKGROUND OF THE INVENTION

Quantification of radiation emitted from various sources is an important function and finds several applications in medical, research, food storage, transportation of sensitive goods, and industrial operations. A dosimeter is one such device used to indicate or measure exposure to ionizing radiation. It is a solid object either available as a plate, or in any other shape that can be easily viewed and sometimes shows visual transformation of color without the use of a spectrophotometer. Several types of dosimeters such as Thermoluminescence Dosimeters (TLD). Optically Simulated Luminescence (OSL), Radio Luminescence Glass (RLG). X-ray film, and Track Etch are currently available in the market. Typically, these are used for measuring and monitoring both medical and industrial radiations such as X-rays, gamma rays, high speed electrons, etc.

Color changing/developing self-indicating Instant Radiation Alert Dosimeters (SIRAD) for monitoring low dose, e.g., are commercially marketed by JP Laboratories Inc., New Jersey under trademark SIRAD®. Dosimeter SIRAD® has a sensing strip made of polymeric material such as colorless solid monomers of diacetylenes. They usually form red or blue colored polymers/plastics when irradiated with high energy radiation such as X-ray, gamma ray, elections, and neutrons. As exposure to radiation increases, the color of the sensing strip comprising diacetylenes intensifies proportional to the dose.

U.S. Pat. No. 8,242,464 [Assigned to Gordhanbhai N. Patel/JP Labs] discloses Identification Personal Dosimeter comprising self indicating radiation sensor, reader allowing the user to estimate the dose instantly.

U.S. Pat. No. 10,060,786 [Assigned to L'Oreal] discloses personal Ultra-Violet (UV) radiation measurement system comprising UV measuring device, terminal device to capture the UV radiation and receive the specific information about user's risk level of UV exposure.

RadSure® irradiation indicator is one kind of dosimetry device, marketed by Ashland Specialty Ingredients Inc. providing positive, visual verification of irradiation. When attached to blood products, RAD-SURE® indicators show whether the blood products have been irradiated or not. Before a blood product and its attached indicator are irradiated, the indicator reads "NOT IRRADIATED". After irradiation, the word "NOT" in the indicator window is obscured and die indicator reads "IRRADIATED". There are a few more commercially available indicators under the tradenames RADTAG® and ONPOINT® as shown in FIG. 1.

Many modifications have been made to the indicators in means of identifying amount of irradiation, reducing contamination, safe-guarding temperature, and visual identification means to alert the user about risk of radiation. However, there is no accurate mechanism to measure actual amount of radiation emitted from the radiation source.

Therefore, there exists a need in die art for a dosimetry device which can quantify the actual radiation (X-rays or gamma rays) exposure at the location of the user and provide detailed information regarding the user.

Surprisingly, our dosimetry device quantifies the actual radiation emitted from the radiation source with high precision.

SUMMARY OF THE INVENTION

In one aspect, provided herein is a dosimetry device for quantifying the dosage of radiation emitted from a radiation source, the device comprising, (i) a radiation dose indicator comprising radiation sensitive composition to measure the radiation and visually represent the amount of radiation emitted as color change; (ii) an optical means to capture the color change of the dose indicator after exposure to radiation: and (iv) a software means to compare the optical density of the dose indicator as compared to a predetermined calibration curve developed using percentage optical density versus cumulative radiation dosage to quantify the dosage of radiation emitted from the radiation source.

In another aspect, provided herein is use of a dosimetry device comprising: (i) a radiation dose indicator comprising radiation sensitive composition to measure the radiation emitted from a radiation source and visually represent the amount of radiation emitted as color change; (ii) an optical means to capture the color change of the dose indicator after exposure to radiation; and (iii) a software means to compare the optical density of the dose indicator to a predetermined calibration curve developed using percentage optical density versus cumulative radiation dosage to quantify the dosage of radiation emitted from the radiation source; in sterilization of surfaces and solutions, medical imaging, medical or industrial equipment quality assurance testing, UV light measurement, food processing and storage, transportation of radiation sensitive materials, or blood storage.

In yet another aspect, provided herein is a method of quantifying the dosage of radiation emitted from a radiation source, comprising the steps of: (i) exposing a dosimetry device to irradiation, said dosimetry device comprising radiation sensitive indicator which measures the radiation and visually represents the amount of radiation emitted as color change; (ii) capturing the color change of the dose indicator after exposure to radiation using an optical means; and; (iii) comparing the optical density of dose indicator to a predetermined calibration curve developed using percentage optical density versus cumulative radiation dosage to quantify the dosage of radiation emitted from the source.

In yet another aspect, provided herein is a dosimetry device as shown in FIGS. 1 to 7.

BRIEF DESCRIPTION OF DRAWINGS

The invention will be better understood from the following detailed description when read in conjunction with the accompanying drawings. It is emphasized that, according to common practice, the various features of the drawing are not to scale. On the contrary, the dimensions of the various features are arbitrarily expanded or reduced for clarity. The following figures are included in the drawing.

DETAILED DESCRIPTION OF THE INVENTION

Figure 1:
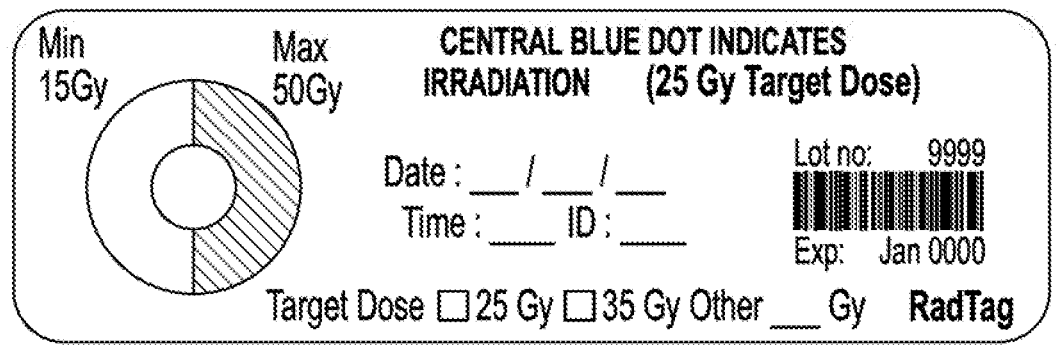
FIG. 1 is a pictorial view of RadTag® (above) and Onpoint® (below) indicators
Figure 1:
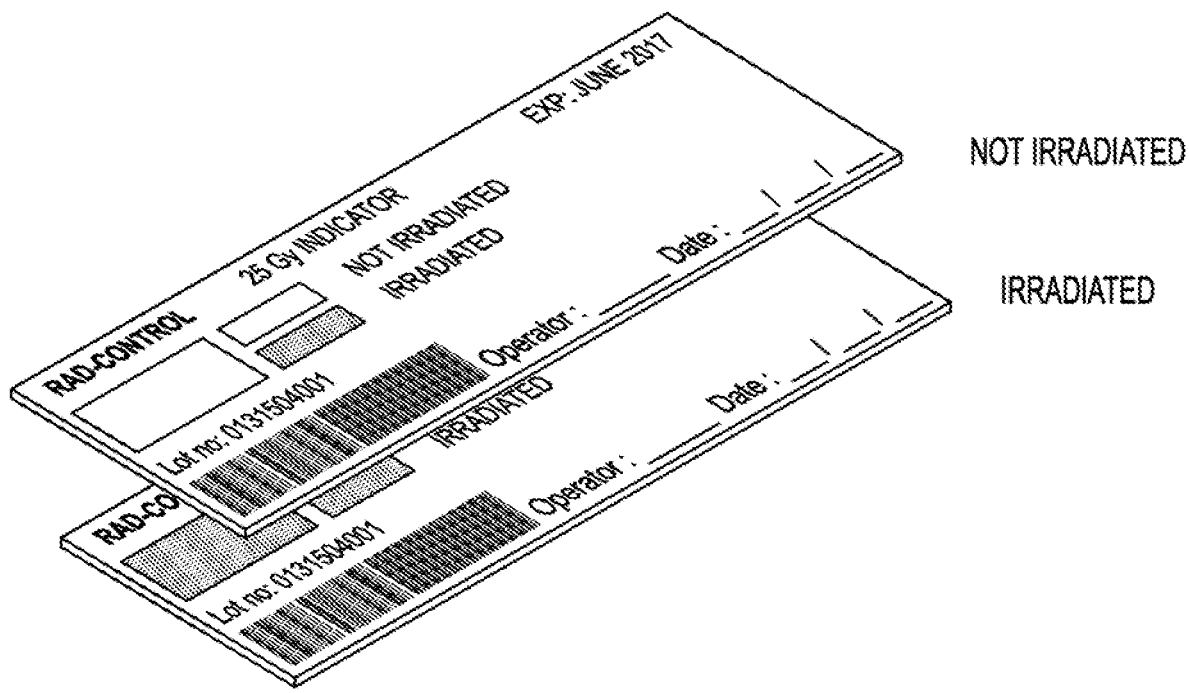

The following detailed description is intended to be representative only and not limiting as to the described dosimeter enabled with improved and accurate radiation quantification functionality. Many variations can be derived by one skilled in the art which are included within the scope of the present invention. The following detailed discussion of the various alternative and preferred embodiments will illustrate the general principles of the invention.

As utilized in accordance with the disclosure, the following terms, unless otherwise indicated, shall be understood to have the following meanings.

All percentages, parts, proportions and ratios as used herein, are by weight of the total composition, unless otherwise specified. All such weights as they pertain to listed ingredients are based on the active level and, therefore: do not include solvents or by-products that may be included in commercially available materials, unless otherwise specified.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contained".

All publications, articles, papers, patents, patent publications, and other references cited herein are hereby incorporated herein in their entireties for all purposes to the extent consistent with the disclosure herein.

The term "Color Space" as used herein generally refers to a color model (or color system) and is an abstract mathematical mode which simply describes the range of colors as tuples or numbers, typically as 3 or 4 values or color components (e.g. RGB). Each color in the system is represented as dot. When defining a color space, the usual reference standard is the CIELAB or CIEXYZ color spaces, which were specifically designed to encompass all colors the average human eyes can see.

The term "Gafchromic® film" as used herein generally refers to a radiochromic dosimetry film designed for the quantitative measurement of absorbed dose of high-energy photons. Key technical features include: (i) dynamic dose range: 10 Gy to 1000 Gy: (ii) develops in real time without post-exposure treatment; (iii) energy-dependence: minimal, response difference from 100 keV into the MV range; (iv) near tissue equivalent: (v) high spatial resolution—can resolve features to sine, or less; (vi) active coating exposed for detection of low energy photon and electron; (vii) proprietary new technology incorporating a marker dye in the active layer: enables non-uniformity correction by using triple-channel dosimetry and decreases UV/light sensitivity; and (viii) stable at temperatures up to 60'C.

The term "ionizing radiation" as used herein generally refers to radiation with a level of energy that is high enough to cause atoms to lose electrons and become charged or ionized. Ionizing radiation may be in the form of high energy particles, like an alpha and beta particles, protons and neutrons, or in the form of electromagnetic waves, like gamma rays or X-rays. High energy particles and electromagnetic waves are released from the nuclei of radioactive atoms that are decaying or may be created by causing accelerated electrons to strike a metal target.

The term "radiation detection medium" as used herein generally refers to a medium that undergoes a detectable change when exposed to radiation. The change may be immediately visible or may require a development process.

The term "radiochromic film' or film as used herein generally refers to film that changes color and produces a visible image when exposed to ionizing radiation, but experiences insignificant change from exposure to visible light or other forms of non-ionizing radiation. This film requires no chemical or physical processing.

The term "Rad-Sure®" as used herein, is a blood irradiation indicator that provides positive visual verification of irradiation at the minimum specified dose. Rad-Sure® indicator is available in two types: Gamma and X-Ray. Gamma is compatible with Cesium-137 or Cobalt-60 radiation sources and X-Ray is compatible with X-ray irradiators that utilize X-rays generated from 160 kVp sources that are filtered through 0.38 ram of copper, or 150 kVp sources that are filtered through 1 mm of aluminum. Manufactured from Gafchromic® film, the world's highest resolution dosimeter, Rad-Sure® is the standard for blood irradiation indicators for over 25 years.

In one embodiment, the present application provides a dosimetry device comprising: (i) a radiation dose indicator comprising radiation sensitive composition to measure the radiation and visually represent the amount of radiation emitted from the radiation source as color change; (ii) an optical means to capture the color change of the dose indicator after exposure to radiation; and (iii) a software means to compare the optical density of the dose indicator to a predetermined calibration curve developed using percentage optical density versus cumulative radiation dosage to quantify the dosage of radiation emitted from the source.

Accordingly, the radiation dose indicator comprises a radiation sensitive composition which measures the radiation and indicates the change in radiation. The radiation sensitive composition is selected from radiation sensitive film, a radiation sensitive patch, or any other device which can detect radiation emitted from the radiation source.

Accordingly, the radiation sensitive composition comprises a radiation sensitive film such as radiochromic film, a film that instantly changes color upon exposure to ionizing radiation and needs no chemical processing is a radiochromic film. These films are widely recognized fix their large exceptional spatial resolution reaching to a level of at least 0.025 mm. Another advantage of radiochromic film is its tissue equivalence that the adsorbed radiation dose is truly reflection of the dose adsorbed by tissue. Materials used in the sensing strip of radiochromic film are a unique class of compounds called diacetylenes with a general formula:

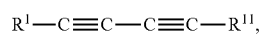

wherein $R^1$ and $R^{11}$ are substituent groups. Di acetylenes are colorless solid monomers. They usually form red or blue colored polymers with a general formula:

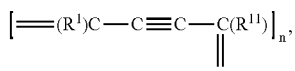

where a is number of monomer units, when irradiated with high energy radiation such as X-my, gamma ray, electrons, and neutrons. As exposure increases, the color of the sensing strip comprising, diacetylenes intensifies proportional to the dose.

Accordingly, commercially available radiochromic film models are manufactured under the commercial name Gafchromic® by Ashland. Specialty Ingredients Inc. Radiochromic film employed in the current application can be selected from HD-V2, EBT3, EBT-XD; MD-V3, RTQA2, XR-QA2, XR-CT2, XR-M2, and XR-RV3.

Accordingly, the radiochromic film has a radiation dose range selected from about 0.1 to about 10,000 Gray (Gy) units per second.

Accordingly, the radiochromic film is Gafchromic® film having an active component which is micro-particulate, radiation sensitive monomer that is dispersed in a polymer matrix and coated onto a polyester film base. When the active monomeric component is exposed to ionizing radiation, a polymerization reaction is initiated, resulting in the production of a dye polymer. Since this polymer is by nature, a dye, the exposure produces coloration within the film.

In another embodiment, the color indicator can be provided with a dye or pigment or combinations thereof that functions as a marker. Accordingly, the dose indicator is activated once radiation is emitted from the radiation source and this change is visually shown as color change.

Accordingly, suitable pigment materials are described in Hunger's "Industrial Organic Pigments." Holes "Dictionary of Pigments," and Leach and Pierce's "Printing Ink Manual."

Examples of yellow colored, organic and inorganic, pigments include C.I. Pigment Yellow 1, C.I. Pigment Yellow 74, azo pigments such as C.I. Pigment 12 and C.I. Pigment Yellow 17 and the like.

Examples of black colored pigments include carbon black, titanium black, aniline black, and the like.

Examples of white colored pigments include basic lead carbonate, zinc oxide, barium sulfate, titanium oxide, silver white, strontium titanate, and the like.

Examples of red colored pigments include naphthol red (C.I. Pigment Red 2), C.I. Pigment Red 3, C.I. Pigment Red 176 and C.I. Pigment Red 23 and the like.

Examples of green colored pigments include phthalocyanine green (C.I. Pigment Green), C.I. Pigment Green 36, and C.I. Pigment Green 1 and the like.

Examples of blue colored pigments include phthalocyanine blue (CI Pigment Blue 15:3), Cd. Pigment Blue 15:6, and C.I. Pigment Blue 16 and the like.

Examples of blue colored dyes include methylene blue, Acid Blue 1, Basic Blue 1 and C.I. Solvent Blue 7 and the like.

Examples of red colored dyes include Acid Red 18, Basic Red 1 and C.I. Solvent Red 8 and the like.

Examples of green colored dyes include Acid Green 1 and Basic Green 1 and the like.

Examples of black colored dyes include C.I. Solvent Black 5 and the like.

In another embodiment, the optical means provided in the dosimetry device captures the color change which occurred due to emission of radiation from the source. Optical means is a camera selected from group comprising a smart phone camera, a high definition camera, a magnifying camera, a densitometer, an image scanner, a video camera, a TV camera, an optical imaging device and the like.

Accordingly, the camera can be a smart phone camera such as iPhone from Apple Inc. The smart phone can comprise a Central Processing Unit (CPU), I/O interface, and a network controller, frequency modulation, Bluetooth combo chip. Further, the CPU can be implemented as multiple processors working in collaboration such as cloud computing environment to perform the instructions of the dosimetry device.

In another embodiment, the software means provided in the dosimetry device converts the captured color change into numerical color data and compares with predetermined data using quantification algorithms.

Accordingly, the captured color is in the form of pixels. The color intensity is measured in the form of "color space". A color space is a useful method for users to understand the color capabilities of a specific digital device or file. It represents what a camera can see, a monitor can display, or a printer can print, and the like. There are a variety of color spaces, such as RGB, CMX, HSV, HIS. Each color is represented as a dot. All the dots are identified and converted to specific set of numbers and measured in triples or tuples, typically as 3 or 4 color components.

Accordingly, RGB (R=Red, G=Green, B=Blue) is a kind of color space which uses red, green and blue to elaborate color model. An RGB color space can be simply interpreted as "all possible colors" which can be made from three colors for red, green and blue. In such conception, each pixel of an image is assigned a range of 0 to 255 intensity values of RGB components. That is to say, using only these three colors, there can be 16,777,216 colors on the screen by different mixing ratios. Currently, RGB color spaces are sRGB and Adobe RGB. The sRGB was developed by both HP and Microsoft in 1977, where "S" can be interpreted as "standard"; while Adobe RGB is a standard color gamut from Adobe. For these two commonly-used color spaces, Adobe RGB offers a wider color space comparing to sRGB, and it contains CMYK color gamut (sRGB does not have it). As a result, Adobe RGB has richer color layers and lower color saturation.

Accordingly, the radiation emitted from the radiation source is captured as color change, color intensity is identified and converted into numbers using RGB software. Preferably, the software program is "Get RGB" from the Imaging Technology Group (ITG) at Beckman Institute at the University of Illinois-Urbana Champaign, is a free, open source software for 2D image analysis; software program developed based on quantification algorithms.

Figure 4:
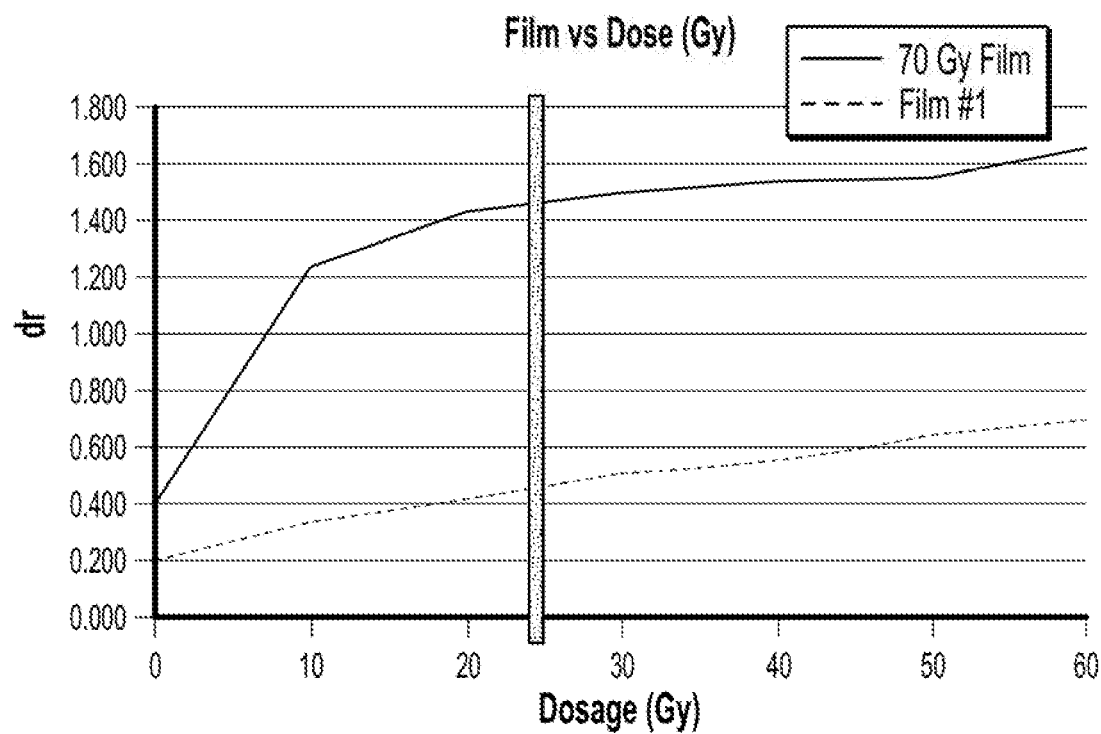
FIG. 4 is a graphical view of comparative optical density measurements for film vs. X-ray exposure level.

In another embodiment, the color data is compared to the predetermined calibration curves of color versus radiation dose response data. The calibration curve is a plot of measured signal (transmission or optical density) versus the absorbed dose. Hence calibration curve can also be termed as an "absorbed dose sensitivity" curve, since the slope at any absorbed dose point is the film absorbed dose sensitivity for that absorbed dose. In general, a calibration curve in terms of optical density will have a non-linear very low dose region, a linear or nearly linear low-to medium dose region, and a non-linear high dose region. The linear region is useful for the quantization of film sensitivity in terms of net optical density per unit absorbed dose. Various optical density measurement data for various radiochromic films have been illustrated in FIG. 4. Calibration curves for a radiation detection medium are often prepared by exposing one or more areas of the detection medium to different and known amounts of radiation using a linear accelerator or a similar device capable of generating a range of known dose levels. Another method frequently used is to expose the detection means to a continuously varying level of doses. This can be done by interposing a wedge of material with continuously varying thickness between the radiation source and the detection medium. Alternatively, the radiation sensitive medium may be sandwiched between two blocks and positioned so that the medium is in a plane parallel to the beam when it is exposed. In this configuration the dose applied to the radiation sensitive medium decreases continuously with depth below the top surface of the blocks. This type of exposure is ° lien referred to as a depth-dose exposure. Typically, calibration curves are generated by measuring the response of the radiation sensitive medium for different dose levels. In the instance of radiation films, it is common to measure the light transmission or optical density of the medium for numerous different radiation dosage levels. Color change images measured as density-red values are cropped into software program selected from "Get Red" and various calibration curves for each lot of dosimetry film are constructed. Hence a library of calibration curves is made available to the user.

In another embodiment, emission of radiation such as X-rays, gamma rays, a nuclear detonation, or any other a radiation source, the self indicating radiation sensor of the device develops color, preferably blue or red, instantly. The color intensifies as the dose increases thereby providing the wearer and medical personnel instantaneous information on cumulative radiation exposure. The color intensity of the sensing strip increases with increasing dose. Dose can be estimated with an accuracy which is better than 20% with color reference chart and better than 10% using a calibration plot of optical density versus dose or CD camera.

Figure 3:
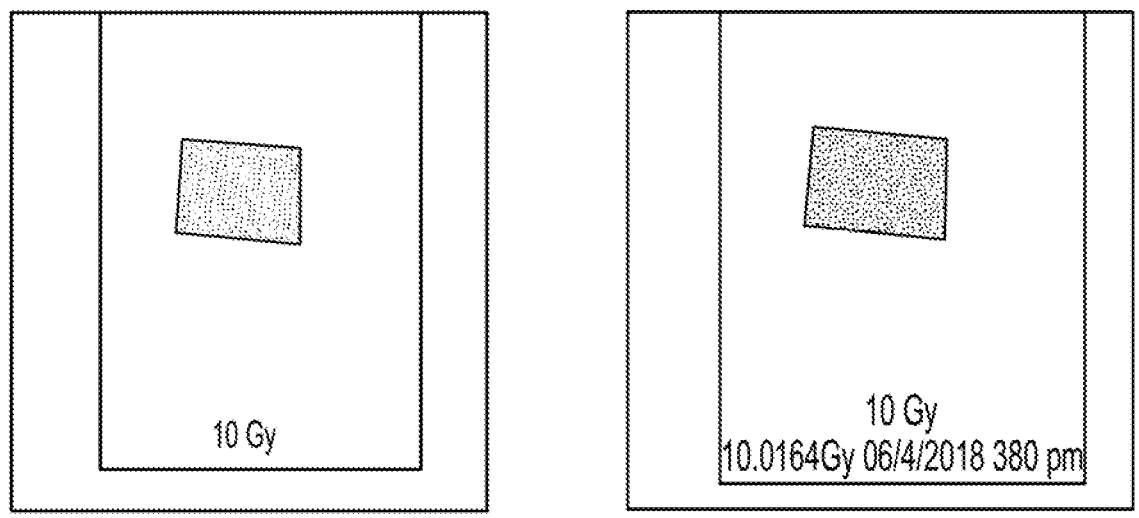
FIG. 3 is a pictorial view of product test assembly for Gafchromic® film #1 before (led) and after (right) exposure to 10Gy in X-ray cabinet

In another embodiment, the test assemblies are subjected to optical density measurements. A cell phone camera is employed to measure color change and is captured in the form of images in HDR mode or with flash mode. The density-red data exhibits a nearly linear response for the radiochromic films in the radiation range of interest (25 (Gy). Surprisingly, it is found that, the red linear response of radiochromic film would be a suitable candidate for developing a dosimetry application, aligning the red optical density experimental result to the X-ray dosage through a linear-type mathematical equation, FIG. 3 and FIG. 4 relate to product test assemble before and after exposure to 20 Gy and 10 Gy radiation doses respectively.

Accordingly, the present application provides an accurate method of monitoring the radiation dose using a new dosimetry device expressed as linear response characteristic of optical density-red of radiation dose sensor with Gafchromic® film radiation within the 0.01 Gray (Gy) per second to about 2000 Gy (Gray) per second dose range using photographic densitometer.

Accordingly, the test assemblies were subjected to optical density measurements. Using, X-Rite 301T photographic densitometer equipped with a reflection head assembly. The results will be measured as dv (density-visual), dr (density-red), dg (density-green) and db (density-blue), As the color changes from blue to red based on the amount of radiation passing through the test subject to radiation, there is consistent increase in the density-red values as measured using a densitometer.

In yet another important embodiment, the present invention provides an accurate method of monitoring the radiation dose using a new dosimetry device expressed as linear response characteristic of optical density-red of radiation dose sensor with Gafchromic® film radiation within the 0.01 Gray (Gy) per second to about 2000 (Gray) Gy per second dose range using smartphone selected from Apple iPhone. The cropped film images are provided in FIG. 6.

In another embodiment, the present application provides a method of quantifying the dosage of radiation emitted from a radiation source, comprising the steps of: (i) exposing the dosimetry device to irradiation, said dosimetry device comprising radiation sensitive indicator which measures the radiation and visually represent the amount of radiation emitted as color change; (ii) capturing the color change of the dose indicator after exposure to radiation using an optical means: and (iii) comparing the optical density of dose indicator to a predetermined calibration curve developed using percentage optical density versus cumulative radiation dosage to quantify the dosage of radiation emitted from the source.

In another embodiment, dosimetry data received from the software means is up-loaded into the cloud enabling access to a plurality of information networks and software management tools.

Figure 2:
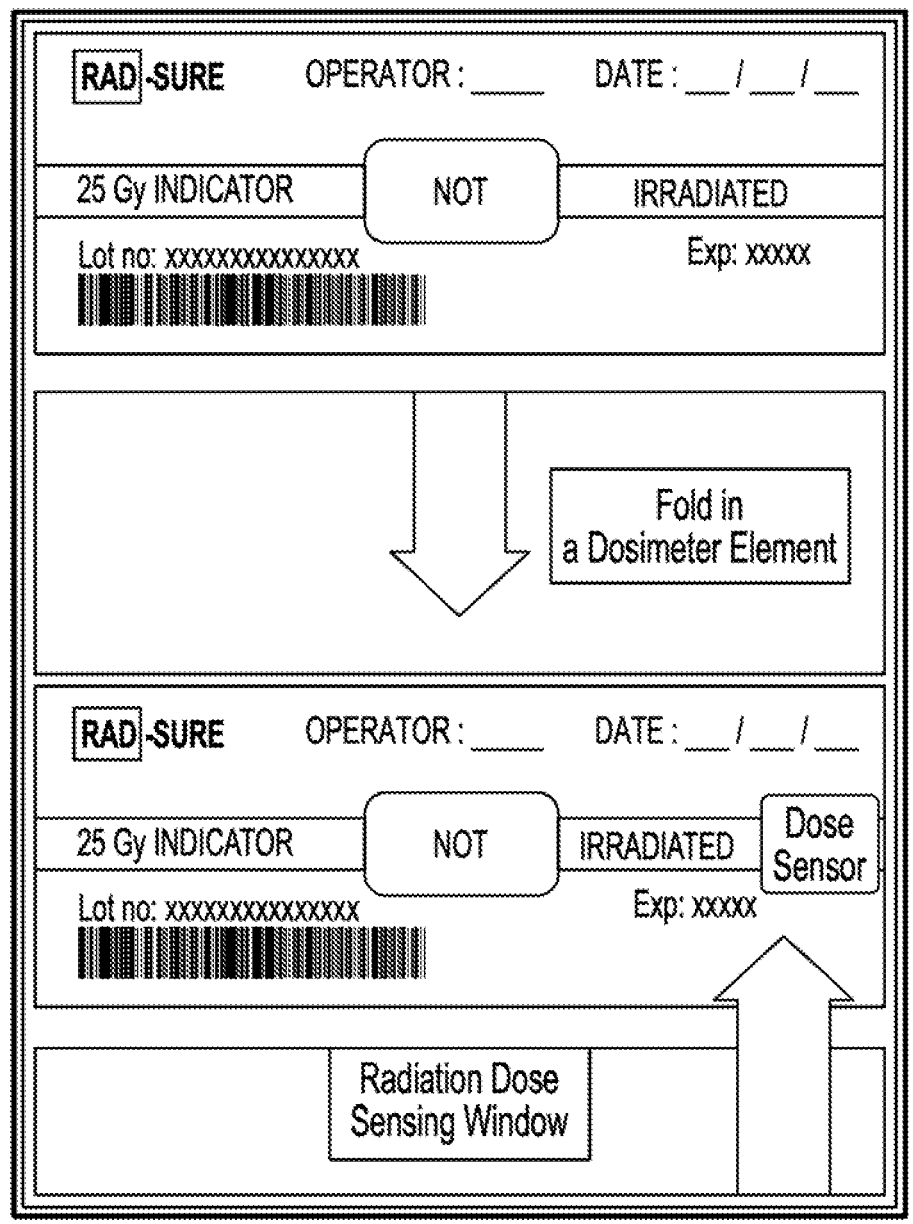
FIG. 2 is a pictorial view of new Rad-Sure®

In another embodiment, the present application provides a dosimetry device as shown in the figures. Inventive dosimetry device with dose sensor is provided in FIG. 2.

Figure 7:
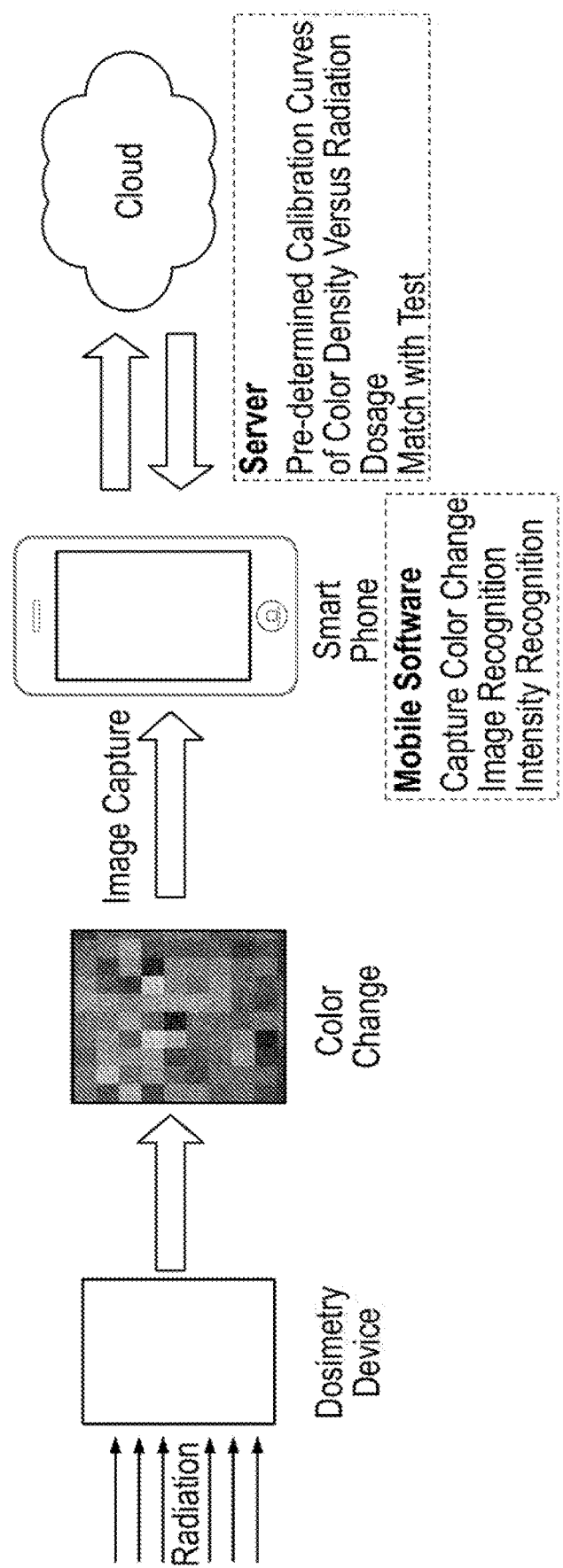
FIG. 7 is a flow diagram of radiation dosimetry device.

In another embodiment, the general work flow of the dosimetry device is as shown in FIG. 7.

In another embodiment, the present application provides use of a dosimetry device comprising: a radiation dose indicator comprising a radiation sensitive composition to measure the radiation and visually represent the amount of radiation emitted as color change; (ii) air optical means to capture the color change of the dose indicator after exposure to radiation; and (iii) a software means to compare the optical density of the dose indicator to a predetermined calibration curve developed using percentage optical density versus cumulative radiation dosage to quantify the dosage of radiation emitted from the radiation source; wherein the dosimetry device is used in sterilization of surfaces and solutions, medical imaging, medical or industrial equipment quality assurance testing, UV light measurement, food processing and storage, transportation of radiation sensitive materials, or blood storage.

In another embodiment, the dosimetry device of the present application finds various uses in blood bags, their method of storage and use. Blood products are irradiated using photons to diminish the risk of transfusion-associated graft vs. host disease (TA-GVHD), The desired effect of irradiating the blood is to inhibit lymphocyte function and therefore to prevent GVHD while not causing damage to platelets and other blood fractions. The UK guidelines for blood irradiation state that all parts of the blood pack should receive at least 2500 cGy. The minimum dosage requirement for blood product are stated as: "The dose of irradiation delivered (for blood processing) should be 2500 cGy (25 Gy) targeted to the central portion of the container and 1500 cGy (15 Gy) should be the minimum dose at any other point." From a regulatory perspective, the EU requires a dosimeter function for such an indicator product to possess a CE mark. For accuracy, all the EU regulation states is the following: per article 15.1 devices with measuring function should be designed and manufactured such way as to provide sufficient accuracy, precision, and stability for intended purpose. Limit of accuracy should be indicated by manufacturer, There are no specifics for degree of accuracy however, there are a couple of ISO standards that may help: ISO 51929:2013 blood irradiation dosimetry; ISO 52628:2013 standard practice for dosimeter in radiation processing.

Accordingly, the dosimetry device of the present application allows user to process the blood product, take a picture of indicator window after blood processing, software application will then process the picture and determine the dosage applied to the blood product. Stability is measured accurately until the shelf life is reached.

The current dosimetry device will continue with the same function as originally devised for without any complexities in using and training required for the end-users. The new indicator will provide data related to actual radiation level each blood bag received during processing. The inventive indicator shall enable users to develop new procedures, data and information with regards to their blood treatment processes.

Within the scope, the current radiation level indicator has the potential for image capture retention, wireless data interfacing, dosimetry to simplify determination of proper blood treatment, result file sharing directly to hospital/treatment center IT systems.

The following, non-limiting examples illustrate important aspects of the present invention and do not in any way limit the scope of the invention.

EXAMPLES

Example 1

Comparative Data of Radiochromic Films

To demonstrate the potential for a dosimeter function, a variety of existing radiochromic film products were evaluated as a function of X-ray radiation exposure. The films or products evaluated are presented in Table 1.

TABLE 1

Products screened for Dosimetry Potential

| Product | Duse Range (Gy) |
|---------|-----------------|
| Film #3 | 70 |
| Film #2 | 145 |
| Film #1 | 10 to 1000 |

Example 2

Exposure to X-Ray Machine

The films or products presented in Table 1 were exposed at 10, 20, 30, 40, 50 and 60 Gr in a Pantak® Unipolar Series 2 HF 160 X-ray machine. The X-ray cabinet was marked XRAD-160. This apparatus was equipped with a CNMC K602 precision dosimeter to determine the actual dosage applied to the films in Gray (Gy) units. In a separate series of film exposures, Gafchromic® film assemblies, mounted M similar fashion, were also tested. An example of this assembly is presented in FIG. 3.

Example 3

Optical Density Measurements

The films or products were also evaluated for optical density. The equipment employed for measuring the optical density was the X-Rite 310T photographic densitometer equipped with a reflection head assembly (model 310-06). This equipment reported four measurement results: chi (density-visual), dr (density-red), dg (density-green) and db (density-blue), Table 2 presents the results of densitometer tests.

TABLE 2

Densitometry results for products screened for response to different X-ray exposure levels

| Product | dv | dr | dg | db | Gy |
|---------|-----|-----|-----|-----|-----|
| Film #3 | 0.816 | 0.405 | 2.639 | 2.944 | 0 |
| 70 Gy | 1.586 | 1.235 | 2.653 | 2.860 | 10 |
| | 1.842 | 1.430 | 2.615 | 2.808 | 20 |
| | 1.983 | 1.497 | 2.816 | 2.999 | 30 |
| | 2.047 | 1.538 | 2.824 | 3.048 | 40 |
| | 2.065 | 1.549 | 2.754 | 3.052 | 50 |
| | 2.148 | 1.655 | 2.833 | 3.003 | 60 |
| Film #2 | 0.834 | 0.454 | 2.557 | 2.874 | 0 |
| 145 Gy | 1.600 | 1.256 | 2.636 | 2.847 | 10 |
| | 1.857 | 1.429 | 2.726 | 2.923 | 20 |
| | 1.994 | 1.528 | 2.757 | 2.955 | 30 |
| | 2.024 | 1.518 | 2.734 | 2.937 | 40 |
| | 2.066 | 1.589 | 2.652 | 2.907 | 50 |
| | 2.135 | 1.655 | 2.755 | 2.924 | 60 |
| Film #1 | 0.2375 | 0.201 | 0.301167 | 0.8035 | 0 |
| | 0.332 | 0.336 | 0.346 | 0.811 | 10 |
| | 0.401 | 0.415 | 0.359 | 0.777 | 20 |
| | 0.455 | 0.507 | 0.424 | 0.849 | 30 |
| | 0.485 | 0.549 | 0.409 | 0.778 | 40 |
| | 0.558 | 0.643 | 0.476 | 0.839 | 50 |
| | 0.599 | 0.696 | 0.501 | 0.855 | 60 | dv - (density-violet) dr - (density-red) dg - (density-green) db - (density-blue)

In analyzing the densitometer results, the dr (density-red) data exhibits a linear response for Gafchromic® film #1 in this exposure range. A comparative plot for the dr results was presented in FIG. 4. The red linear response of film #1 suggests that this film technology would be a suitable candidate for developing a dosimetry application, aligning the red optical density experimental result to the X-ray dosage through a linear-type mathematical equation.

Example 4

Radiation Measured as Color Change and Captured in the Form of Images

Figure 5:
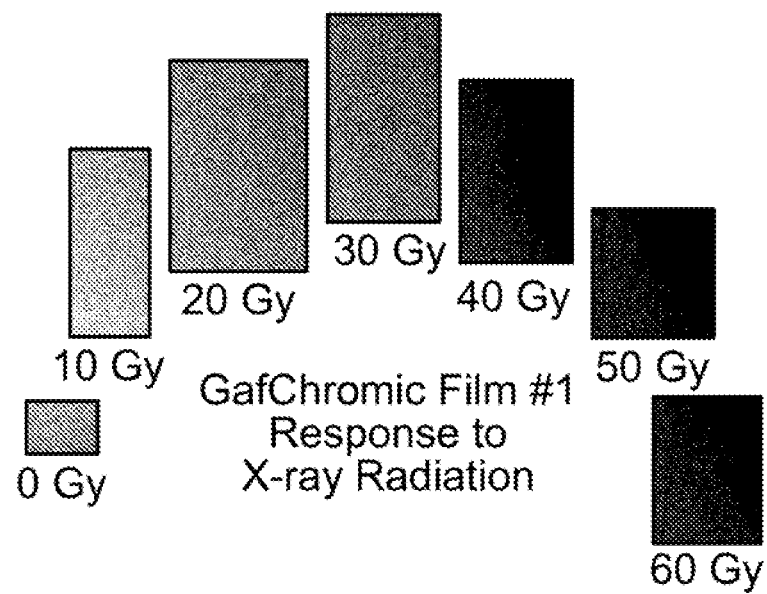
FIG. 5 is a graphical view of Gafchromic® film #1 response to varying degree of X-ray radiation exposure (without flash)

A cell phone camera was employed to measure the color change in the radiochromic film, an Apple iPhone 5S (Model A1533) equipped with software version 112.1(15C153) was employed to take pictures, in HDR mode or without flash (which removes the HDR mode). The cropped radiochromic film images from this exercise are presented in FIG. 5.

Using the iPhone, pictures in HDR mode were captured. These images were cropped and saved in .jpg file format. To convert the color information in these images into RGB format, a software program called "Get. RGB," from the Imaging Technology Group (ITG) at the Beckman Institute at the University of Illinois-Urbana Champaign was employed. The results (via point selection, not averaged) show that there was minimal variation in this raw data and conversion of these raw data into RGB format is presented in Table 3.

TABLE 3

Figure 6:
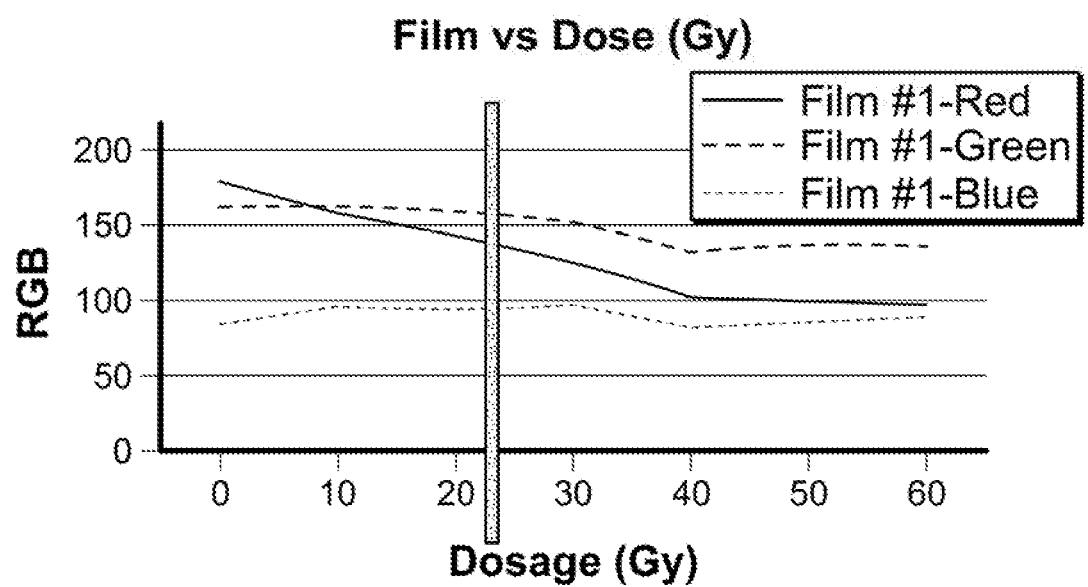
FIG. 6 is a graphical view of Gafchromic® film #1 RGB data front iPhone captured images.

| RGB data for jpg images in FIG. 6 | | | | |
|---|---|---|---|---|
| Film #1 | R | G | B | Gy |
| | 179 | 162 | 84 | 0 |
| | 158 | 163 | 96 | 10 |
| | 143 | 159 | 94 | 20 |
| | 125 | 152 | 97 | 30 |
| | 102 | 132 | 82 | 40 |
| | 100 | 137 | 86 | 50 |
| | 97 | 136 | 89 | 60 |

The red data from Table 3 exhibited a nearly linear response for the radiochromic film π1 in the radiation range of interest. This effect is more easily visualized in the graph presented in FIG. 5. From the results presented in FIG. 6, a linear calibration curve relating color to dose appears feasible.

Although the present invention is shown and described with respect to certain aspects, it is obvious that various modifications will become apparent to those skilled in the art upon reading and understanding the specification and the appended claims. The present invention includes all Such improvements and modifications and is limited only by the scope of the

We claim:

1. A dosimetry device for quantifying a dosage of radiation emitted from a radiation source, the device comprising:
   (i) a radiation dose indicator comprising a radiation sensitive film prepared from polyacetylene, lithium, sodium, potassium or zinc salt of polyacetylene capable of measuring an amount of radiation emitted from a radiation source, wherein the radiation measured may be in a radiation dose range of about 0.01 Gray (Gy) per second to about 10,000 Gray (Gy) per second and producing a representation of the amount of radiation emitted as a color change;
   (ii) an optical means configured to capture the color change produced by the dose indicator after the dose indicator is exposed to the amount of radiation; and
   (iii) software configured to compare an optical density of the color change produced by the dose indicator with a predetermined calibration curve to quantify the dosage of radiation emitted from the radiation source, wherein the predetermined calibration curve is developed using a percentage of optical density versus a cumulative radiation dosage, and wherein the predetermined calibration curve is based on an optical density-red linear response characteristic of the radiation dose sensor.

2. The dosimetry device of claim 1, wherein the radiation sensitive film is a radiochromic film.

3. The dosimetry device of claim 1, wherein the radiation sensitive composition comprises a marker.

4. The dosimetry device of claim 3, wherein the marker comprises a dye or a pigment.

5. The dosimetry device of claim 1, wherein the optical means is selected from the group consisting of a smart phone camera, a high definition camera, a magnifying camera, a magnifying microscope, a densitometer, an image scanner, a video camera a TV camera, and an optical imaging device.

6. The dosimetry device of claim 1, wherein the software comprises a software program based on quantification algorithms capable of characterizing the color change in the form of color spaces, converting the color spaces into a numerical dosimetry data set and comparing the numerical dosimetry data set to a pre-determined color versus radiation dose response data set.

7. The dosimetry device of claim 6, wherein the numerical dosimetry data set is capable of being up-loaded into a cloud computing environment, enabling access to a plurality of information networks and software management tools.

8. The dosimetry device of claim 1, wherein the dosimetry device is regulatory compliant and is configured to be used to facilitate safe storage of blood in blood bags, sterilization of surfaces and solutions, medical imaging, medical or industrial equipment quality assurance testing, UV light measurement, food processing and storage, and transportation of radiation sensitive materials.

9. A method of quantifying a dosage of radiation emitted from a radiation source, comprising the steps of:
   (i) exposing a dosimetry device to irradiation, said dosimetry device comprising a radiation sensitive indicator comprising a radiation sensitive film prepared from polyacetylene, lithium, sodium, potassium or zinc salt of polyacetylene configured to measure an amount of radiation emitted from the radiation source, wherein the radiation measured by the indicator may be in a radiation dose range of about 0.01 Gray (Gy) per second to about 10,000 Gray (Gy) per second and produce a visual representation of the amount of radiation as a color change;
   (ii) capturing the color change of the dose indicator after exposure to the amount of radiation using an optical means; and
   (iii) comparing an optical density corresponding to the color change to a predetermined calibration curve to quantify the dosage of radiation emitted from the radiation source, wherein the predetermined calibration curve is developed using percentage optical density versus cumulative radiation dosage, and wherein the predetermined calibration curve is based on an optical density-red linear response characteristic of the radiation dose sensor.

10. The method of claim 9, wherein the optical means is a photographic densitometer.

11. The method of claim 9, wherein the optical means is a smart phone.

* * * * *